US012782737B2

(12) United States Patent
Liu et al.

(10) Patent No.: US 12,782,737 B2
(45) Date of Patent: Nov. 3, 2026

(54) GRATING STRUCTURE, LENS, AND HEAD-MOUNTED DISPLAY

(71) Applicant: Goertek Optical Technology Co., Ltd., Weifang (CN)

(72) Inventors: Lichuan Liu, Shandong (CN); Yi Rao, Shandong (CN)

(73) Assignee: Goertek Optical Technology Co., Ltd., Weifang (CN)

( * ) Notice: Subject to any disclaimer, the term of this patent is extended or adjusted under 35 U.S.C. 154(b) by 219 days.

(21) Appl. No.: 18/714,310

(22) PCT Filed: Aug. 19, 2022

(86) PCT No.: PCT/CN2022/113521
§ 371 (c)(1),
(2) Date: May 29, 2024

(87) PCT Pub. No.: WO2023/093144
PCT Pub. Date: Jun. 1, 2023

(65) Prior Publication Data

US 2025/0020928 A1 Jan. 16, 2025

(30) Foreign Application Priority Data

Nov. 29, 2021 (CN) ......................... 202111438547.6

(51) Int. Cl.
*G02B 27/01* (2006.01)
*F21V 8/00* (2006.01)
*G02B 1/10* (2015.01)

(52) U.S. Cl.
CPC ........... *G02B 27/0172* (2013.01); *G02B 1/10* (2013.01); *G02B 6/0016* (2013.01)

(58) Field of Classification Search
CPC .... G02B 27/0172; G02B 1/10; G02B 6/0016; G02B 5/18; G02B 5/1866; G02B 27/01
See application file for complete search history.

(56) References Cited

U.S. PATENT DOCUMENTS

2017/0315281 A1* 11/2017 Suto ......................... G02B 5/32
2020/0166754 A1* 5/2020 Leister ................. G02B 5/3083

FOREIGN PATENT DOCUMENTS

CN 110244463 A 9/2019
CN 110764260 A 2/2020
CN 112130246 A 12/2020
CN 114217438 A 3/2022

* cited by examiner

*Primary Examiner* — Mariam Qureshi
(74) *Attorney, Agent, or Firm* — Baker Botts LLP

(57) ABSTRACT

The present disclosure provides a grating structure, a lens, and a head-mounted display. The grating structure comprises a base and a plurality of grating sections provided on a surface of the base, the plurality of grating sections are spaced apart in an extending direction of the base, at least a portion of a surface of the grating section is coated with an enhancement layer, and the enhancement layer has a refractive index greater than that of the grating sections.

11 Claims, 8 Drawing Sheets

GRATING STRUCTURE, LENS, AND HEAD-MOUNTED DISPLAY

CROSS-REFERENCE TO RELATED APPLICATIONS

This application is a National Stage of International Application No. PCT/CN2022/113521, filed on Aug. 19, 2022, which claims priority to Chinese Patent Application No. 202111438547.6, filed on Nov. 29, 2021, both of which are hereby incorporated by reference in their entireties.

TECHNICAL FIELD

The present disclosure relates to the technical field of diffractive optical devices, and particularly to a grating structure, a lens, and a head-mounted display.

BACKGROUND

AR (Augmented Reality, Augmented Reality) display is a technology that calculates the position and angle of the camera's image in real time and adds corresponding images, videos, 3D models, whose goal is to embed the virtual world into the real world on the screen and interact with it.

The AR display typically emits incident light from an image source, and the incident light is reflected and refracted by a lens before entering into the human eye for viewing. Therefore, the performance of the lens directly affects the image quality and experience of AR devices. It is known that the lens comprises a substrate and grating structures provided on the substrate, and the grating structure generally comprises functional areas such as for light coupling, light pupil expansion, and light coupling out, which enables light transmission imaging.

The existing grating structures have a relatively low refractive index of their materials, and the difference in refractive index with the air medium is also small, which results in low light transmission efficiency and poor uniformity in color and brightness at different spatial positions or angles. However, if materials with high refractive index are directly chosen, it will cause a high-difficulty processing technique, and if direct etching is used, it will cause high processing cost and will be unsuitable for mass production.

SUMMARY

Based on this, in response to the issue of low refractive index of the grating structure and the non-uniformity of color and brightness due to different spatial positions and angles, it is necessary to provide a grating structure, a lens, and a head-mounted display, aiming to effectively increase the refractive index of the grating and thereby improve transmission efficiency and achieve uniformity at different positions and angles.

To achieve the above objective, the present disclosure provides a grating structure applied to a head-mounted device. The grating structure comprises a base and a plurality of grating sections provided on a surface of the base, the plurality of grating sections are spaced apart in an extending direction of the base, at least a portion of a surface of the grating section is coated with an enhancement layer, and the enhancement layer has a refractive index greater than that of the grating sections.

Optionally, the enhancement layer is made of one of titanium dioxide, alumina and magnesium oxide:

and/or, the refractive index of the enhancement layer is 1.25 times or more than the refractive index of the grating sections.

Optionally, each grating section comprises a top surface parallel to the surface of the base and a side surface connected to the top surface and the surface of the base, and each of the top surface, the side surface and the surface of the base provided with the grating sections is provided with an enhancement layer;

and/or, the base is made of silicon dioxide or resin;

and/or, the grating sections are made of silicon dioxide or resin.

Optionally, enhancement layers coated on at least two of the top surface, the side surface and the surface of the base are of different thicknesses.

Optionally, in an arranging direction of the plurality of the grating sections, the grating sections have a height greater than a width of the grating sections, the enhancement layers coated on the top surface and the surface of the base are of the same thickness, which is less than a thickness of the enhancement layer coated on the side surface.

Optionally, the thickness of the enhancement layer coated on the top surface is 70% to 80% of the thickness of the enhancement layer coated on the side surface.

Optionally, in an arranging direction of the plurality of the grating sections, the grating sections have a height greater than a width of the grating sections, the enhancement layers coated on the top surface and the surface of the base are of the same thickness, which is greater than a thickness of the enhancement layer coated on the side surface.

Optionally, the grating structure has a period set to A, and the thickness D of the enhancement layer ranges from 4% of A to 6% of A.

Optionally, each grating section has a height H ranging from 40% of A to 60% of A:

and/or, in an arranging direction of the plurality of the grating sections, each grating section has a width ranging from 15% of A to 35% of A.

Optionally, the enhancement layer is coated by means of atomic layer deposition, chemical vapor deposition, physical vapor deposition, or magnetron sputtering;

and/or, the grating structure is a coupled-in grating or coupled-out grating.

To achieve the above objective, the present disclosure further provides a lens. The lens comprises a substrate and the grating structure described as in any one of the above, and a surface of the base facing away from the grating section is attached to the surface of the substrate.

To achieve the above objective, the present disclosure further provides a head-mounted display. The head-mounted display comprises an image source and the above lens, and the lens is located on a light-emitting side of the image source.

Optionally, the grating structure, when being a coupled-in grating, is provided right facing the image source:

and/or, the image source is a silicon-based liquid crystal module, a transmission liquid crystal module, a digital light processing module or a laser scanning module.

Optionally, the image source has a field of view ranging from 40° to 60°;

and/or, the image source has an emitting light wavelength ranging from 520 nm to 530 nm.

In the technical solution proposed by the present disclosure, the grating structure comprises the base and the plurality of grating sections provided on the base. By plating a layer of enhancement layer on the surface of the grating section, the enhancement layer has a refractive index greater than that of the grating section. When light is directed towards the grating structure, it first reaches the surface of the enhancement layer, which indirectly increases the average refractive index of the grating structure, that is, it increases the refractive index difference between the grating structure and the air medium, thereby improving the diffraction efficiency of the grating structure. Compared to materials that have a high refractive index overall, it effectively reduces the processing cost. When the optoelectronic image is coupled into the grating structure, it may ensure the light transmission efficiency and uniformity of the image, so as to achieve high transmission efficiency and uniformity of light of different colors under conditions of different areas and different angles, thereby enhancing the image quality and experience effect of the head-mounted display.

BRIEF DESCRIPTION OF THE DRAWINGS

In order to clearly illustrate embodiments of the present disclosure or technical solutions in the prior art, accompanying drawings that need to be used in description of the embodiments or the prior art will be briefly introduced as follows. Obviously, drawings in following description are only the embodiments of the present disclosure. For those skilled in the art, other drawings can also be obtained according to the disclosed drawings without creative efforts.

DESCRIPTION OF REFERENCE SIGNS

Figure 1:
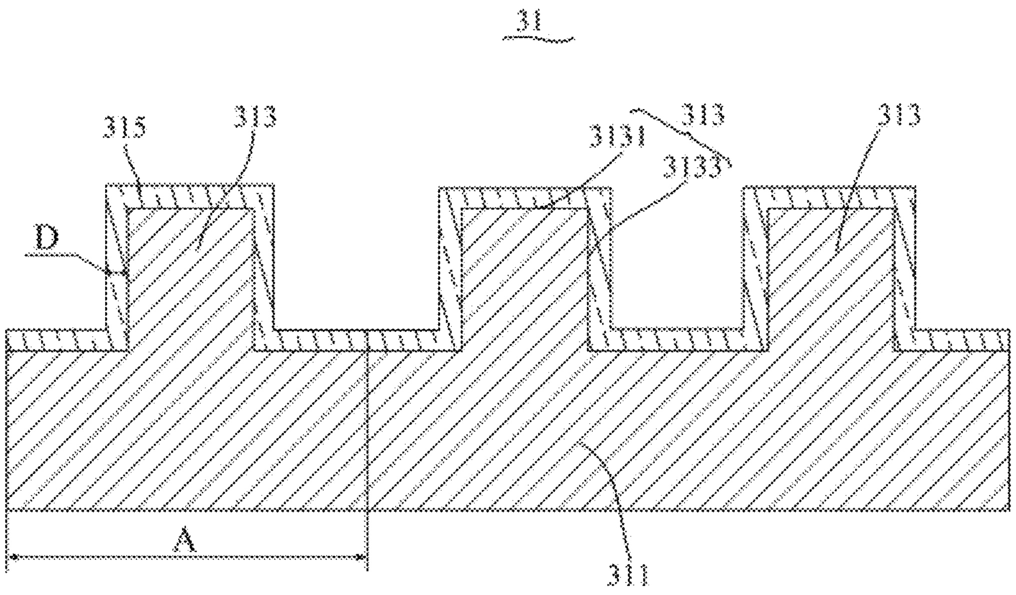
FIG. 1 is a cross-sectional view of a grating structure according to an embodiment of the present disclosure.

| Number | Name | Number | Name |
|---|---|---|---|
| 100 | Head-Mounted Display | 313 | Grating Section |
| 10 | Image Source | 3131 | Top Surface |
| 30 | Lens | 3133 | Side Surface |
| 31 | Grating Structure | 315 | Enhancement Layer |
| 311 | Base | 33 | Substrate |

The realization of the objectives, functional features and advantages of the present disclosure will be further explained with reference to the attached drawings in connection with the embodiments.

DETAILED DESCRIPTION

Technical solutions in the embodiments of the present disclosure are described below with reference to the accompanying drawings in the embodiments of the present disclosure. Apparently, the described embodiments are merely some rather than all of the embodiments of the present disclosure. All other embodiments, acquired by those of ordinary skill in the art based on the embodiments of the present disclosure without any creative work, should fall into the protection scope of the present disclosure.

It should be noted that directional indications (such as up, down, left, right, forward, back . . . ) in embodiments of the present disclosure are used only for explaining the relative positional relationships, movements, and the like among the various components in a particular attitude (as shown in the accompanying drawings), and are correspondingly changed if the particular attitude is changed.

In addition, terms “first”, “second” and the like involved in the present disclosure are only used for descriptive purposes and should not be understood as indicating or implying relative importance or implying a number of indicated technical features. Therefore, a feature delimited with “first”, “second” may expressly or implicitly include at least one of those features. In the description of the present disclosure, “a plurality” means at least two, such as two, three, etc., unless specifically defined otherwise.

In the present application, unless otherwise expressly specified and limited, terms “be connected to”, “fixed” and other terms should be interpreted in a broad sense, for example, “be connected to” can be a fixed connection, a detachable connection, or an integrated; it can be a mechanical connection or an electrical connection; it can be a direct connection or an indirect connection through an intermediate medium; it may be connection within the two elements or an interaction relationship between the two elements, unless explicitly defined otherwise. For those of ordinary skill in the art, the specific meanings of the above terms in the present application can be understood according to specific situations.

Furthermore, the technical solutions of the various embodiments of the present disclosure may be combined with each other, but this must be based on the premise that they can be implemented by a person of ordinary skill in the art. When the combination of technical solutions is mutually contradictory or unimplementable, it should be considered that such a combination of technical solutions does not exist and is not within the scope of protection claimed in the present disclosure.

The efficiency of a diffraction grating is typically influenced by three main factors: the first is the difference in refractive index between the grating and air, the second is the ratio of the width of the grating to air, and the third is the height of the grating. Due to the limitations on manufacturing processes and materials, it is difficult to apply materials with extremely high refractive indices or gratings with a small width-to-height ratio. Therefore, the present disclosure provides a grating structure that achieves high efficiency by plating a film with high refractive index on its surface.

Please refer to FIG. 1, in an embodiment of the present disclosure, the grating structure 31 comprises a base 311 and a plurality of grating sections 313 provided on a surface of the base 311, the plurality of grating sections 313 are spaced apart in an extending direction of the base 311, at least a portion of a surface of the grating section 313 is coated with an enhancement layer 315, and the enhancement layer 315 has a refractive index greater than that of the grating section 313.

In the present embodiment, the grating structure 31 is applied to a lens 30 in a head-mounted display 100 comprising an AR (Augmented Reality) display, and may also be used in a MR (Mixed Reality) display or XR (Extended Reality) display. The grating structure 31 comprises the base 311 and the plurality of grating sections 313 provided on the surface of the base 311. Here, the base 311 and the grating sections 313 may be made of the same material, which facilitates processing. Specifically, the base 311 and the grating sections 313 are integrally molded structures. The grating structures 31 are machined on a substrate (e.g., a glass substrate), a colloid is coated on the substrate, the colloid is pressed together by a mold, and the base 311 and the grating sections 313 of the above structure are obtained after demolding. The plurality of grating sections 313 are spaced apart in an extending direction of the base 311, and the extending direction of base 311 may be an extension in its width direction or length direction, which is not limited herein. When the grating sections 313 are spaced apart in the width direction of the base 311, they may extend in the length direction of the base 311; or, when the grating sections 313 are spaced apart in the length direction of the base 311, they may extend in the width direction of the base 311. Of course, both the extending direction and the arranging direction of the grating sections 313 may also be set at an angle to the width direction of the base 311, which is not limited herein.

It is understandable that the grating structure 31 may be a conventional binary rectangular grating, or it may be a blazed grating (serrated), a tilted grating, or a multi-level grating, etc., which is not limited herein. The surface of the grating section 313 is coated with an enhancement layer 315. The material of the enhancement layer 315 is not limited, as long as its refractive index is greater than that of the grating section 313, and it can be selected accordingly based on the material of the grating sections 313.

Specifically, the coated film is the enhancement layer 315, which is provided on a surface of the grating sections 313 by a plating process. The plating process may be carried out through Atomic Layer Deposition (ALD), Chemical Vapor Deposition (CVD), Physical Vapor Deposition (PVD), or sputtering. The above plating process is simple, effectively reduces the manufacturing cost compared to the etching process while enhancing the refractive index of the material, and is suitable for the mass production of gratings and thus increases production capacity.

Figure 2:
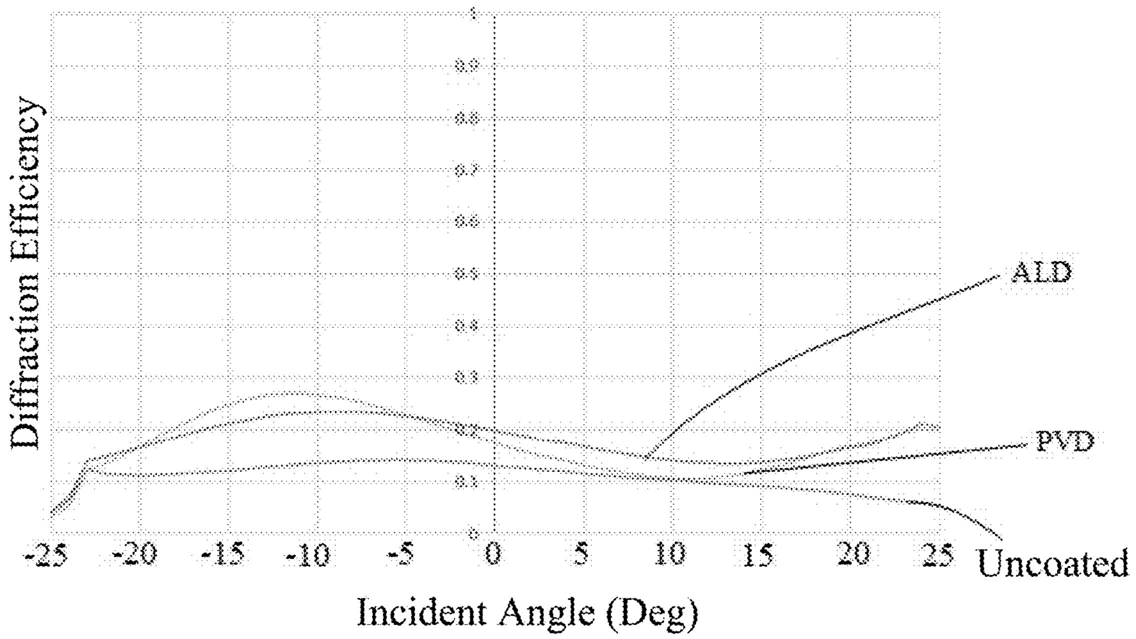
FIG. 2 is a comparison chart of the diffraction efficiencies of the grating structures with different plating processes of the present disclosure and a grating without a coated film at various incident angles.

Please refer to FIG. 2, it shows the impact of different processes on the diffraction efficiency of the grating structure 31 at various incident angles, assuming all other conditions remain constant. In the graph, the abscissa represents the incident angle, which is the angle between the incident light and the surface of the grating, and the ordinate represents the diffraction efficiency in percentage. It can be seen from this figure that the average diffraction efficiency of the uncoated grating is relatively low, and the average diffraction efficiency of the grating structure 31 obtained through the PVD plating process is significantly improved. However, the uniformity across different incident angles is slightly lower than that of the ALD plating process. The average diffraction efficiency of the grating structure 31 obtained through the ALD plating process is even higher and more uniform across various field of views.

Figure 3:
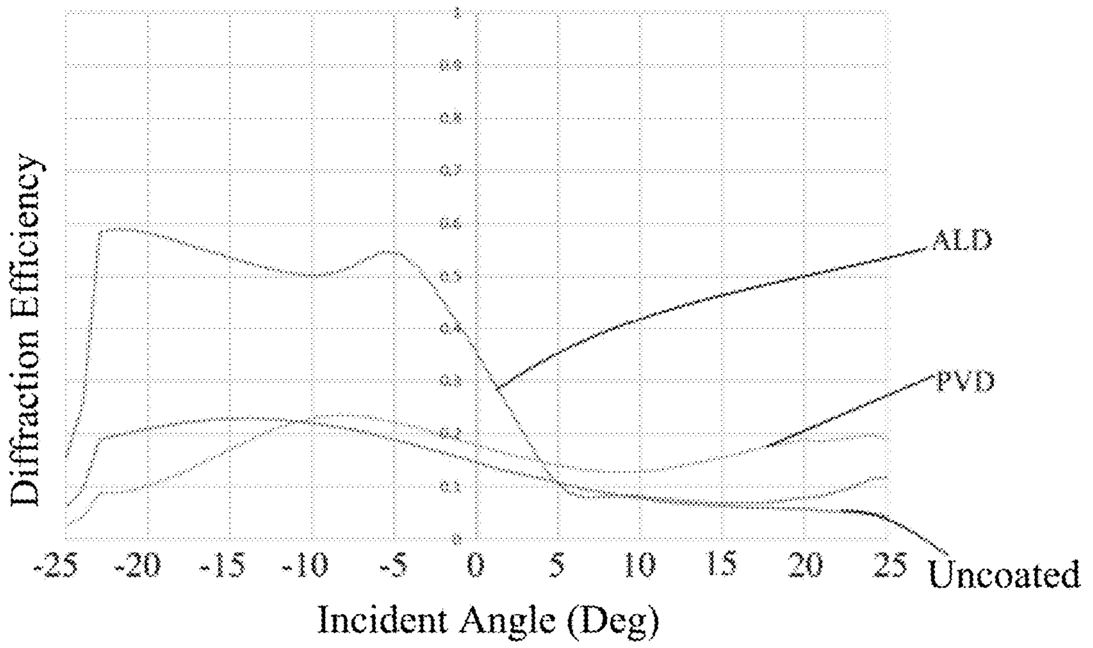
FIG. 3 is a comparison chart of the maximum diffraction efficiencies of the grating structures with different plating processes of the present disclosure and a grating without a coated film at various incident angles.

Please refer to FIG. 3, which is a comparison chart of the maximum diffraction efficiency of the grating corresponding to different processes, it can be known from this figure that under the given design conditions, the average value of the maximum diffraction efficiency of the grating without plating the enhancement layer 315 is the lowest, the average value of the maximum diffraction efficiency of the grating structure 31 coated with the enhancement layer 315 by PVD is slightly improved, and the average value of the maximum diffraction efficiency of the grating structure 31 obtained by ALD plating process is significantly improved, especially when the incident angle is between −25° and 5°, thereby greatly improving the maximum diffraction efficiency.

Figure 4:
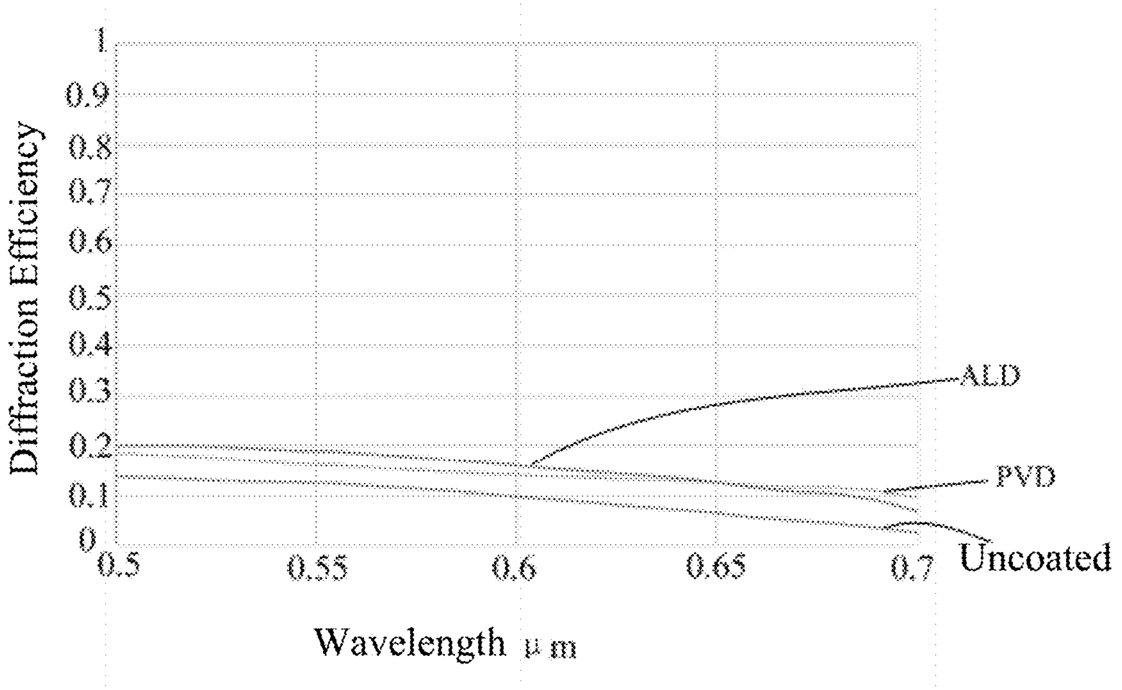
FIG. 4 is a comparison chart of the diffraction efficiencies of the grating structures with different plating processes of the present disclosure and a grating without a coated film at various incident wavelengths.

Please further refer to FIG. 4, it shows the impact of different processes on the diffraction efficiency of the grating structure 31 at various incident wavelengths, assuming all other conditions remain constant. It can be known from this figure that the average value of the diffraction efficiency of the grating without plating the enhancement layer 315 is relatively low, the average value of the diffraction efficiency of the grating structure 31 obtained by PVD plating process is significantly improved, and the average value of the diffraction efficiency of the grating structure 31 obtained by ALD plating process is the highest.

Therefore, in the technical solution proposed by the embodiment of the present disclosure, the grating structure 31 is applied to the head-mounted device, and comprises the base 311 and the plurality of grating sections 313 provided on the base 311. By plating a layer of enhancement layer 315 on the surface of the grating section 313, the enhancement layer 315 has a refractive index greater than that of the grating section 313. When light is directed towards the grating structure 31, it first reaches the surface of the enhancement layer 315, which indirectly increases the average refractive index of the grating structure 31, that is, it increases the refractive index difference between the grating structure 31 and the air medium; moreover, due to the plating of the enhancement layer 315, it is possible to reduce the spacing between the two grating sections 313 and indirectly change the ratio of the width of the grating section 313 to the spacing between the two grating sections 313; in addition, the enhancement layer 315 may also elevate the grating section 313, thereby improving the diffraction efficiency of the grating from the above three aspects. Compared to materials that have a high refractive index overall, it effectively reduces the processing cost. When the optoelectronic image is coupled into the grating structure 31, it may ensure the light transmission efficiency and uniformity of the image, so as to achieve high transmission efficiency and uniformity of light of different wavelengths under conditions of different areas and different angles, therefor enhancing the image quality and experience effect of the head-mounted display 100.

Based on the above structure, the grating structure 31 may be a coupled-in grating or coupled-out grating.

Figure 5:
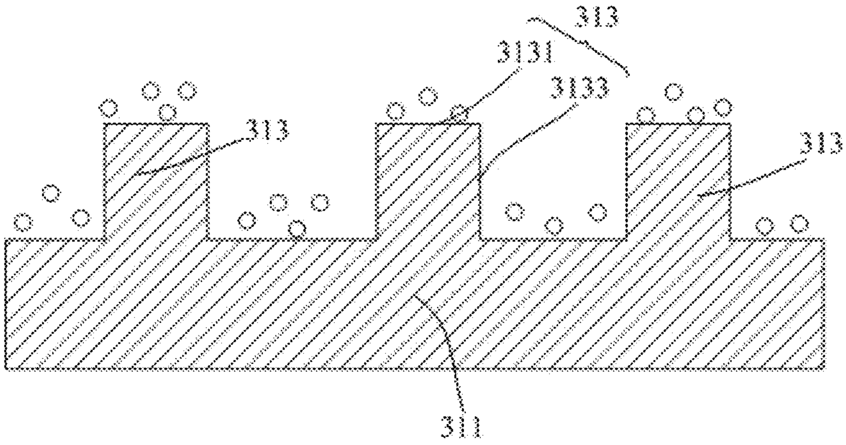
FIG. 5 is a process schematic diagram of the grating structure of the present disclosure in a physical vapor deposition plating process.

Due to different plating way of plating processes, the uniformity of the formed enhancement layer 315 may vary, which will result in different impacts on the diffraction efficiency. Please refer to FIG. 5, when the grating section 313 of the grating structure 31 is relatively flat and has small undulations, that is, when the height of the grating section 313 is relatively small and the distance between adjacent grating sections 313 relatively large, such as in blazed gratings, the PVD plating process may be selected. This process enables that the material of the enhancement layer 315 is directly evaporated by an electron beam or an electric filament, and is ultimately deposited layer by layer on the surface of the grating section 313, returning to a solid state to form a film. That is, this process achieves direct deposition from the material source to the sample to be coated. Therefore, this process is subject to the limitations of the shape and surface of the grating structure 31, and for a relatively flat grating structure 31, this process can form a better film effect.

Figure 6:
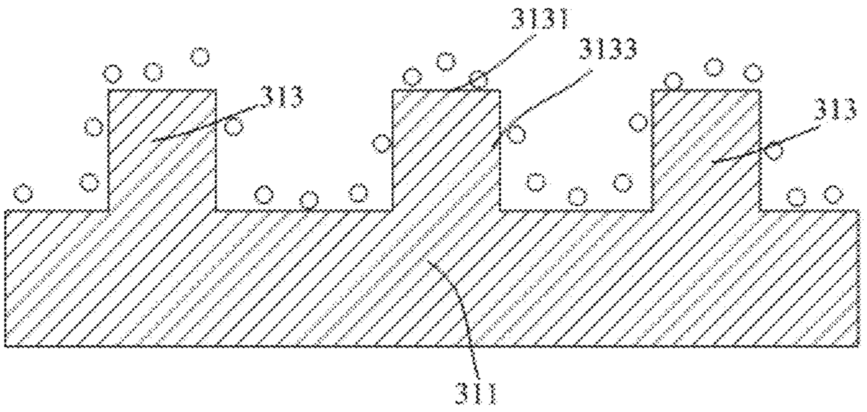
FIG. 6 is a process schematic diagram of the grating structure of the present disclosure in an atomic layer deposition plating process.

Please refer to FIG. 6, for other types of the grating structure 31, atomic layer deposition process may be chosen for coating, which is a thin film deposition technique. Based on the vapor-phase chemical deposition with strictly controlled process sequences, the coating material may grow layer by layer on the surface of the grating section 313 and base 311 through chemical reactions, thereby adhering uniformly in all directions and at all angles. That is to say, the top surfaces 3131, side surfaces 3133 and the base 311 where of the grating section 313 is provided may all have good adhesion and deposition, without being limited by the shape and surface of the grating structure 31. The process may achieve a uniform, dense and well-maintained film of gratings with various special-shaped structures, and as a result, after coating the enhancement layer 315 with this process, it is possible to effectively improve the diffraction efficiency and uniformity. Generally, the light transmission efficiency may be increased by 50% to over 200%, thereby better meeting the needs of human eye experience, and thus enhancing the experience and applicability of the head-mounted display 100.

In one embodiment, the enhancement layer 315 is made of one of titanium dioxide, alumina and magnesium oxide:

and/or, the refractive index of the enhancement layer 315 is 1.25 times or more than the refractive index of the grating section 313.

It is understandable that, in order to save costs, the base 311 in the grating structure 31 is generally made of silicon dioxide (with a refractive index of 1.45) or resin (with a refractive index of 1.5). Herein, the material for the base 311 is also chosen to be one of the silicon dioxide and the resin. Similarly, the material for the grating section 313 is the same as that for the base 311, and is one of the silicon dioxide and the resin. Therefore, in the present embodiment, as long as the refractive index of the material for the enhancement layer 315 is greater than that of the above material. For example, the material for the enhancement layer 315 may be set to one of titanium dioxide (with a refractive index of 2.76 to 2.55), alumina (with a refractive index of 1.76), and magnesium oxide (with a refractive index of 1.732), thereby increasing the average refractive index of the grating structure 31, increasing the refractive index difference between it and the air medium, and thus enhancing the diffraction efficiency of the grating.

Figure 7:
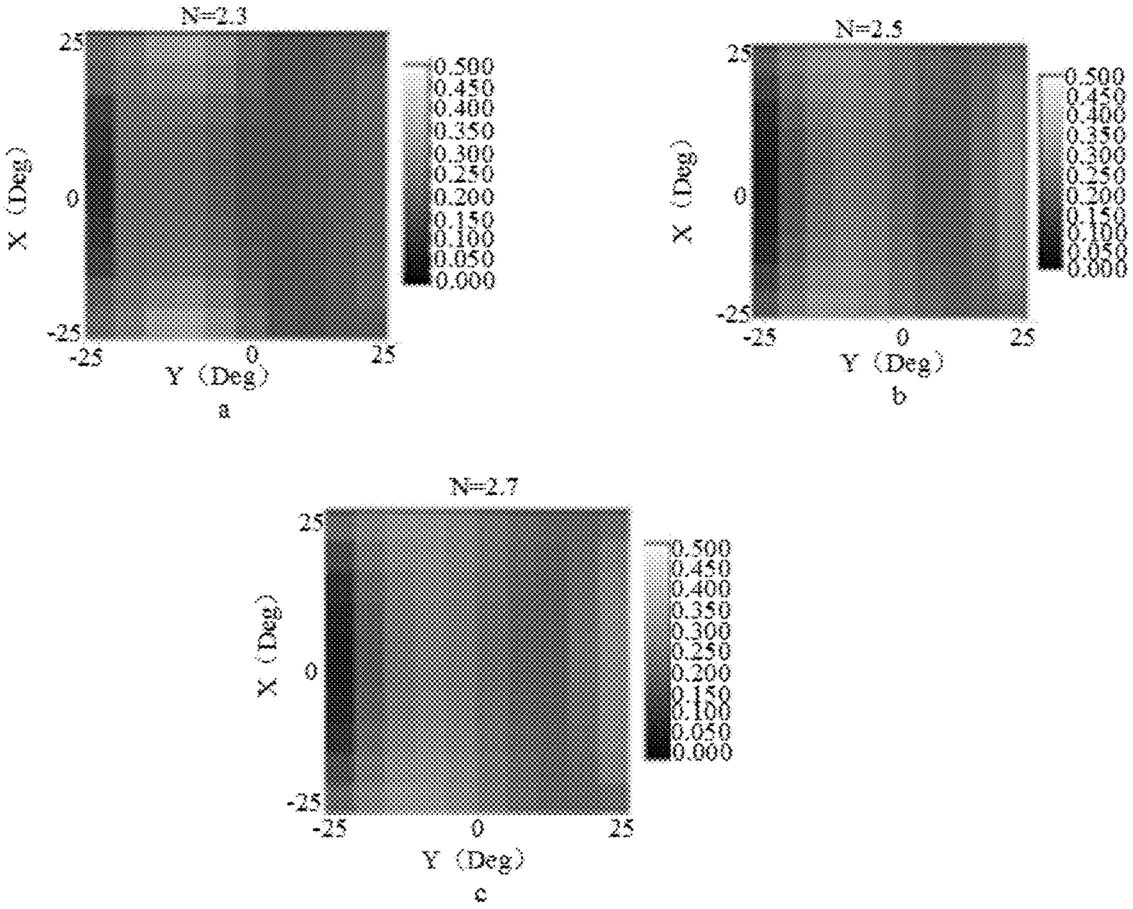
FIG. 7 shows, with a, b, c, comparison charts of the diffraction efficiencies of the grating structure of the present disclosure at different refractive indices of the plating materials.

It is understandable that, as the refractive index of the enhancement layer 315 increases, the average refractive index of the grating structure 31 also increases, and thus the difference between the overall refractive index of the grating structure 31 and the refractive index of air becomes larger, and it becomes easier to adjust the diffraction efficiency. In one embodiment, in order to obtain better diffraction efficiency and uniformity of the image, the refractive index of the material for the enhancement layer 315 may be 1.25 times or more of the refractive index of the material for the grating section 313. For example, when the material for the base 311 and the grating section 313 is silicon dioxide or resin, the titanium dioxide may be selected as the enhancement layer 315, thereby effectively ensuring the high transmission performance of the grating structure 31. Of course, as the refractive index of the enhancement layer 315 gradually increases, the uniformity and efficiency of the transmitted image are improved, but the magnitude of the increase will also tend to stabilize. Therefore, there is no need to set the refractive index of the enhancement layer 315 too high. Please refer to FIG. 7, the abscissa represents the angle between the incident light and the Y-axis of the plane where the grating structure 31 is located, and the ordinate represents the angle between the light and the X-axis of the grating structure 31. It can be understood that each image has a diagonal field of view of 35° and an aspect ratio of 1:1. In the figure, each grid with a different gray scale is a large pixel; the lighter the gray scale, the higher the diffraction efficiency of the corresponding light. In the comparison chart of materials with different refractive indices, it can be seen that the improvement effect tends to stabilize when the refractive index reaches 2.5 or above.

Of course, when other semiconductor materials are used, the CVD process may also be used for coating.

In one embodiment, each grating section 313 comprises a top surface 3131 parallel to the surface of the base 311 and a side surface 3133 connected to the top surface 3131 and the surface of the base 311, and each of the top surface 3131, the side surface 3133 and the surface of the base 311 provided with the grating section 313 is provided with the enhancement layer 315.

In the present embodiment, taking the grating structure 31 as a common binary grating, the grating section 313 comprises the top surface 3131 and the side surface 3133. To further ensure a high refractive index of the grating structure 31, the enhancement layer 315 is provided on both the top surface 3131 and the side surface 3133. At the same time, the surface of the base 311 where the grating section 313 is provided is also coated with the enhancement layer 315, such that the surface of the grating structure 31 that comes into contact with the light is coated with the enhancement layer 315, thereby allowing each light to achieve a higher transmission efficiency, and thus improving the uniformity of the image when the light is incident at different regions and angles. Herein, the top surface 3131 and the side surface 3133 may be set perpendicularly or at an inclined angle.

Optionally, the grating structure 31 has a period set to A, and the thickness D of the enhancement layer 315 ranges from 4% of A to 6% of A.

Optionally, each grating section 313 has a height H ranging from 40% of A to 60% of A;

and/or, in an arranging direction of the plurality of the grating section 313, each grating section 313 has a width ranging from 15% of A to 35% of A.

In the present embodiment, since the diffraction efficiency of the grating structure 31 is directly proportional to its overall refractive index, the thickness of the coated enhancement layer 315 should not be too small. However, there are also certain requirements for the height and width of the grating structure 31, so the thickness of the coated enhancement layer 315 should not be too large either. Herein, the period of the grating structure 31 is set to A, and the thickness D of the coated enhancement layer 315 ranges from 4% A to 6% A, that is, the coated thickness D is 4%, 5%, 6%, etc., of the period A of the grating structure 31. For example, when the period A of the grating structure 31 is 375 nm, the thickness D may be 15 nm, 18.75 nm, or 22.5 nm, which results in a good diffraction efficiency.

It is understandable that the height and width of the grating section 313 should not be too small, otherwise the diffraction will not be sufficient in height and width. Of course, the height and width should not be too large either, as this would also result in poor diffraction effects. In one embodiment, the range for the height H of each grating section 313 is set to 40% A to 60% A. For example, the height of the grating section 313 is 40%, 50%, or 60% of the period A of the grating structure 31, which allows for a better diffraction efficiency and uniformity. In another embodiment, the range for the width of each grating section 313 is set to 15% A to 35% A. For example, the width of the grating section 313 is 15%, 20%, 25%, 30%, 35%, etc., of the period A of the grating structure 31. By combining this with the thickness of the above enhancement layer 315 and the height of the grating section 313, it is possible to achieve a better diffraction efficiency and uniformity.

Optionally, the enhancement layer 315 coated on at least two of the top surface 3131, the side surface 3133 and the surface of the base 311 are of different thicknesses.

The geometric shape of the grating section 313 also affects the diffraction efficiency, and when light is directed towards the grating structure 31, the light received by the top surface 3131 and the side surface 3133 are also different. In the present embodiment, the thickness of the enhancement layer 315 coated to at least two of the three surfaces—the top surface 3131, the side surface 3133, and the base 311—is set to be different. For example, the thickness of the enhancement layer 315 coated to both the top surface 3131 and the base 311 is the same, but differs from the thickness coated to the side surface 3133.

Figure 8:
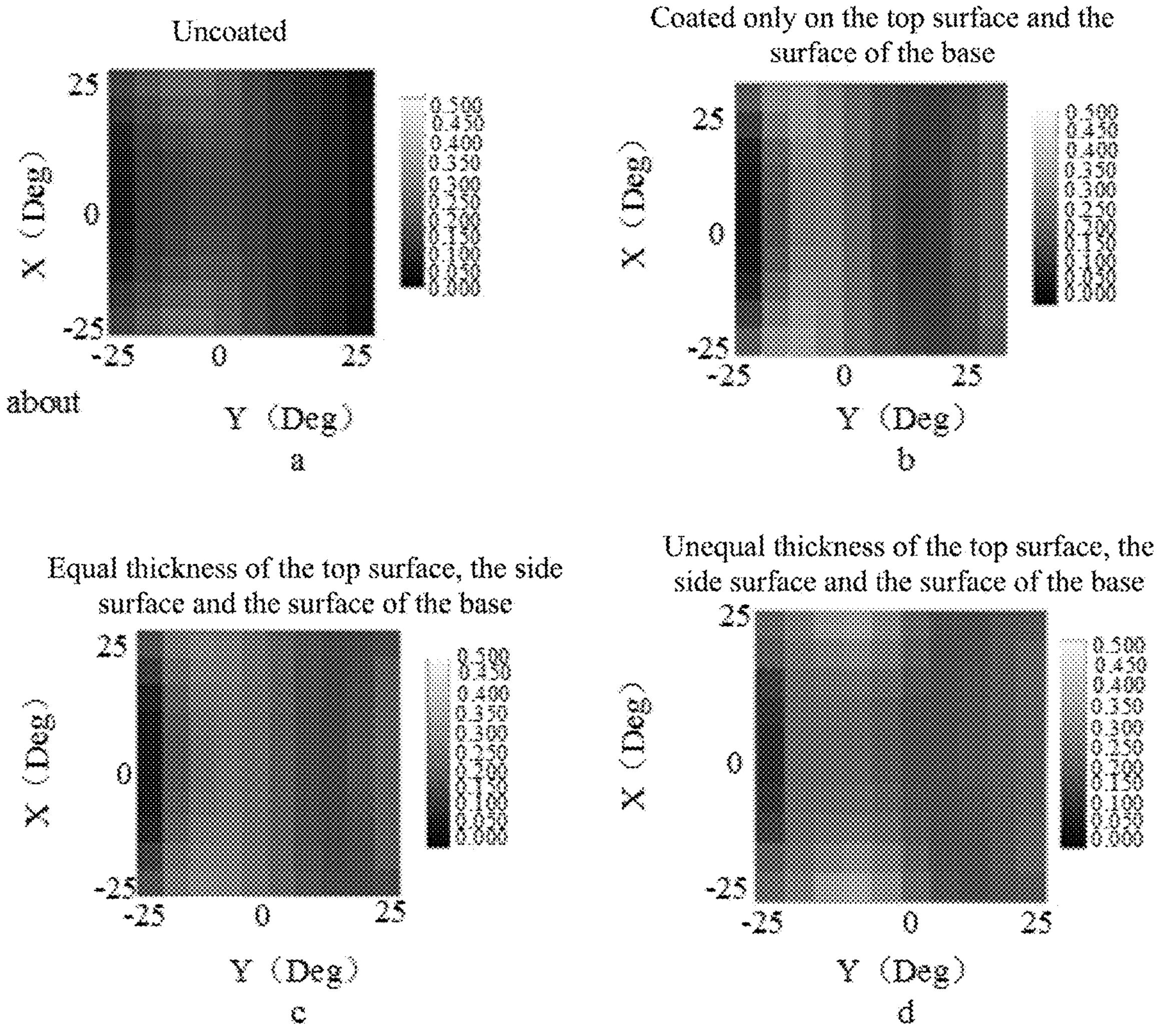
FIG. 8 shows, with a, b, c, d, comparison charts of the image output efficiencies of the grating structure of different embodiments of the present disclosure under the condition of one period and the grating without a coated film.

Please refer to FIG. 8, when the period A of the grating structure 31 is 375 nm, the size of the grating section 313 is based on the above values, the range of thicknesses for the coated enhancement layer 315 is based on the above values, and the refractive index of the coated layer is 1.9, the comparison chart in the figure is obtained. In this figure, the abscissa represents the angle between the incident light and the Y-axis of the plane where the grating structure 31 is located, and the ordinate represents the angle between the light and the X-axis of the grating structure 31. It can be understood that each image is an image with a diagonal field of view of 35° and an aspect ratio of 1:1. In the figure, each grid with a different gray scale is a large pixel; the lighter the gray scale, the higher the diffraction efficiency of the corresponding light.

As a result of coating the enhancement layer 315 on different planes of the grating structure 31, compared to the grating sample without enhancement layer 315, the grating structure 31 coated with the enhancement layer 315 has improved diffraction efficiency and uniformity. Wherein, when only the top surface 3131 and the base 311 are coated, its diffraction efficiency and uniformity are not as good as the structure in which the top surface 3131, the side surface 3133 and the base 311 are coated, while when each of the top surface 3131, the surface of the base 311 and the side surface 3133 is coated with the enhancement layer 315 and the top surface 3131 and the side surface 3133 are coated in different thickness, the diffraction efficiency and uniformity are the best. Therefore, the technical solution of the present embodiment may effectively enhance the brightness and uniformity of the image on the head-mounted device to which the grating structure 31 is applied, thereby improving the user's experience.

Figure 9:
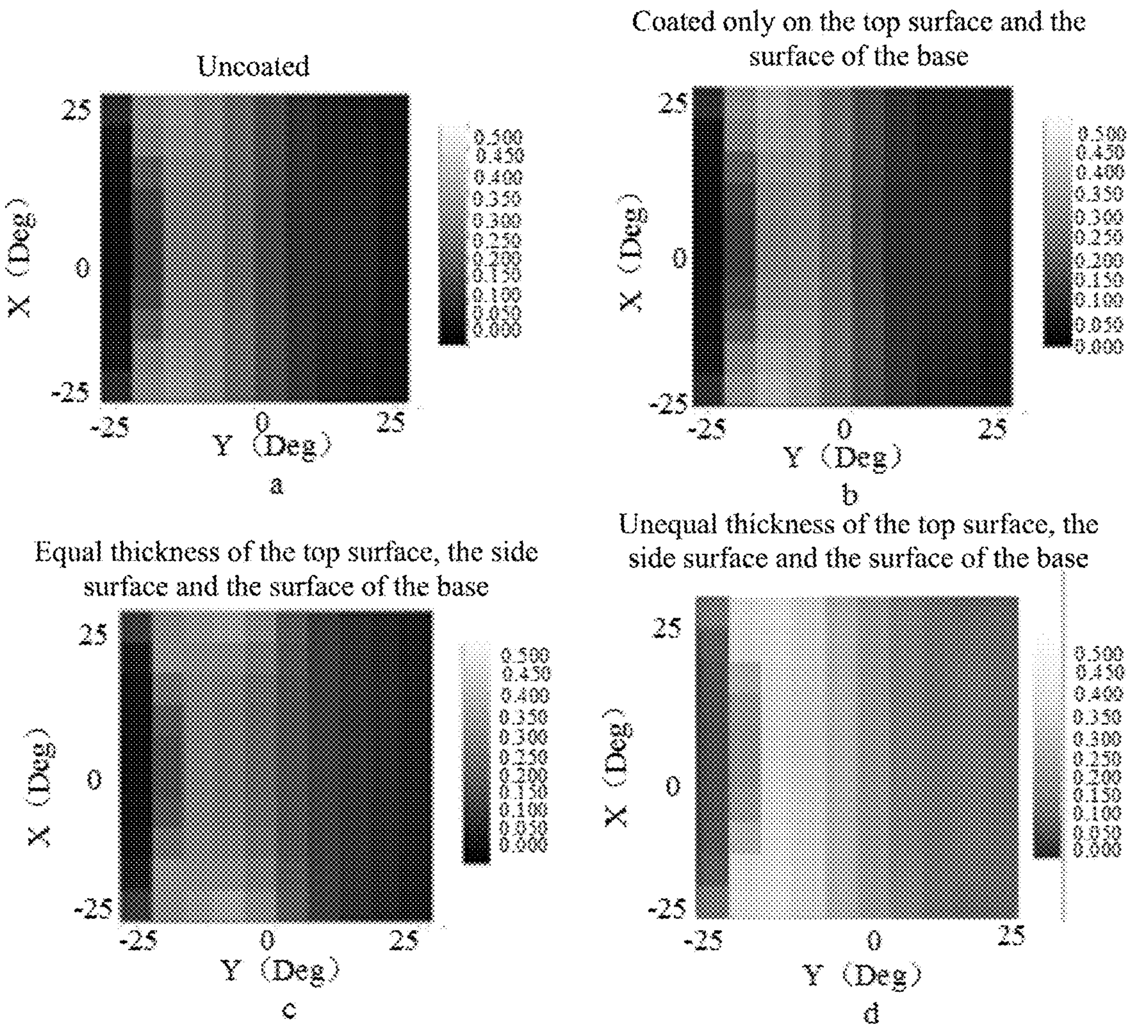
FIG. 9 shows, with a, b, c, d, comparison charts of the image output efficiencies of the grating structure of different embodiments of the present disclosure under the condition of another period and the grating without a coated film.

In another embodiment, please refer to FIG. 9, when the period A of the grating is 400 nm, the other parameters refer to the above data. As the period is increased, the height and width of the grating section 313 are also slightly increased, and the coated film thickness is correspondingly increased. For example, when D is 5% of A and the thickness D is 20 nm, it can be seen that the image transmission efficiency of the coated enhancement layer 315 has been significantly improved.

Optionally, in an arranging direction of the plurality of the grating section 313, the grating section 313 have a height greater than a width of the grating section 313, the enhancement layer 315 coated on the top surface 3131 and the surface of the base 311 are of the same thickness, which is less than a thickness of the enhancement layer 315 coated on the side surface 3133.

In the present embodiment, the grating structure 31 is of the high-thin type, that is, the height of the grating section 313 is greater than the width of the grating section 313. Herein, the thickness of the enhancement layer 315 coated on the top surface 3131 is the same as the thickness of the enhancement layer 315 coated on the base 311, and both of them are smaller than the coated thickness of the side surface 3133. In this way, it is possible to ensure that each surface is interspersed with the air medium, achieve a more ideal average refractive index value, and thus obtain the better diffraction efficiency.

As an alternative embodiment, the thickness of the enhancement layer 315 coated on the top surface 3131 is 70% to 80% of the thickness of the enhancement layer 315 coated on the side surface 3133. Through experimental verification, it has been found that in the setup of the structure, the interlacing distribution between the grating structure 31 and the air medium is more uniform, therefore achieving the better diffraction efficiency.

Figure 10:
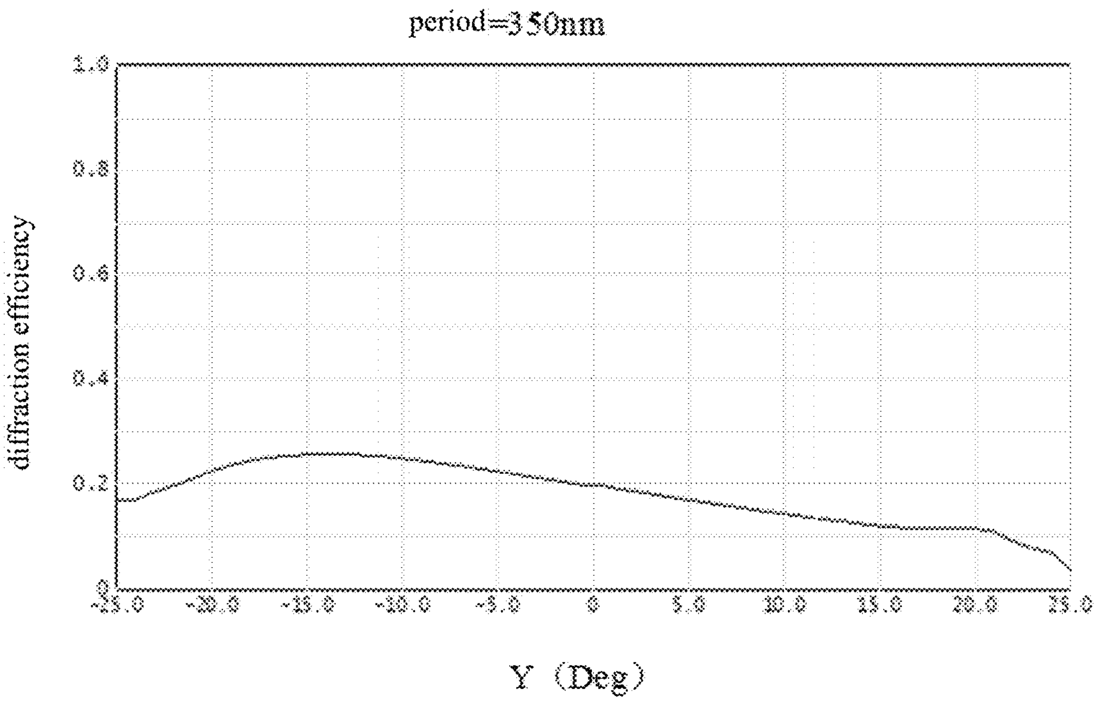
FIG. 10 is a curve chart of the diffraction efficiency of the grating structure of the present disclosure under the condition of one period and one plating thickness.

Please refer to FIG. 10, the figure presents a diffraction efficiency curve under the condition where the period of the grating is 350 nm, the grating structure 31 is the high-thin type, and the thickness of the coated film on the top surface 3131 is 80% of the thickness of the coated film on the side surface 3133. In this figure, the abscissa represents the angle between the incident light and the Y-axis of the plane where the grating structure 31 is located, and the ordinate represents the diffraction efficiency. When the diffraction efficiency is 0.2, it is 20%. It can be seen that the curve is relatively flat, and the average diffraction efficiency is more than 15%, which meets the design requirements.

Figure 11:
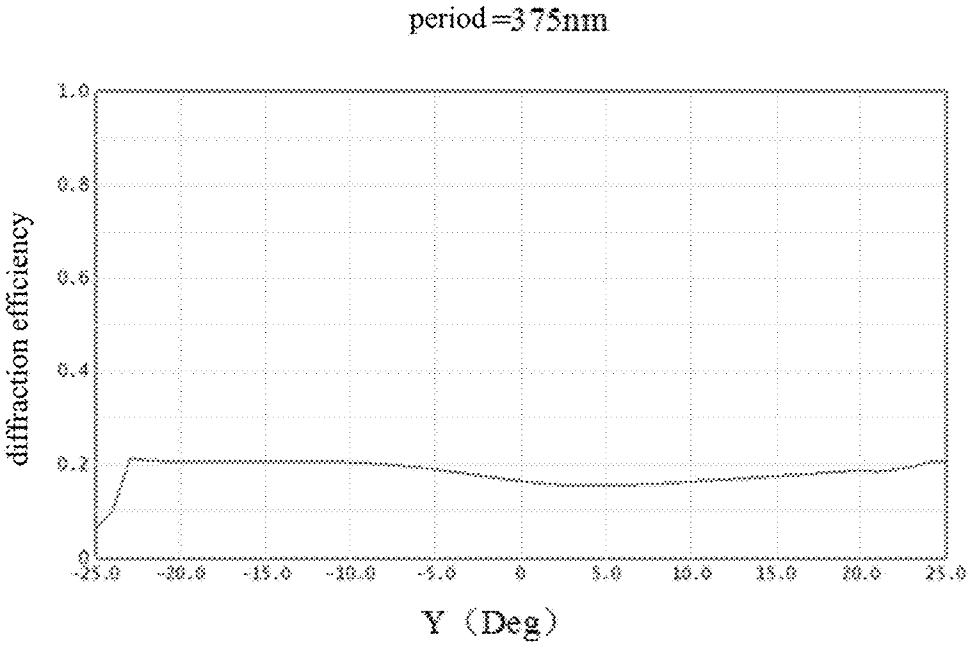
FIG. 11 is a curve chart of the diffraction efficiency of the grating structure of the present disclosure under the condition of another period and another plating thickness.

Please refer to FIG. 11, the figure presents a diffraction efficiency curve under the condition where the period of the grating is 375 nm, the grating structure 31 is the high-thin type, and the thickness of the coated film on the top surface 3131 is 74% of the thickness of the coated film on the side surface 3133. It can be seen that the curve is relatively flat, and the average diffraction efficiency is more than 15%, which meets the design requirements.

Figure 12:
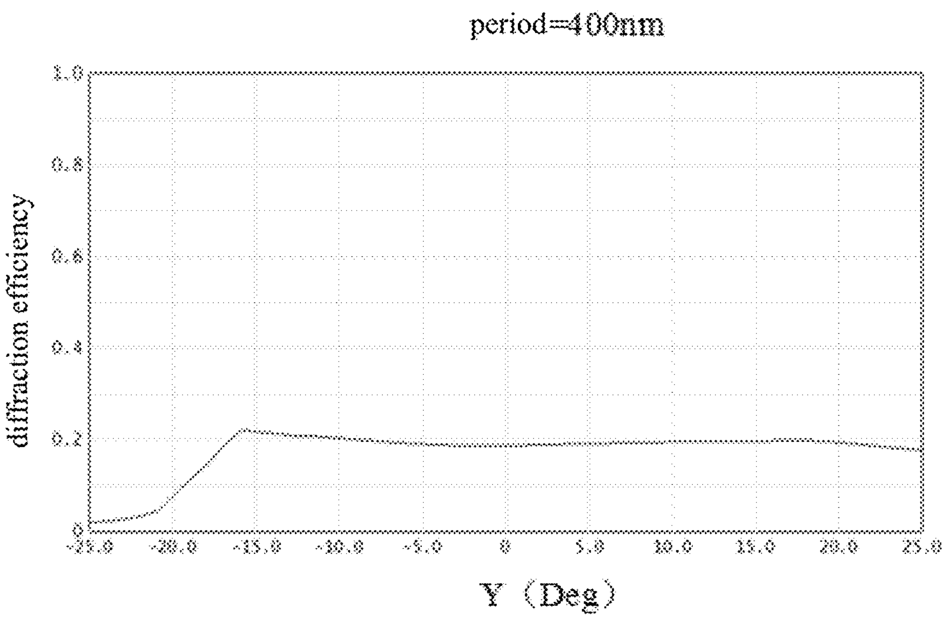
FIG. 12 is a curve chart of the diffraction efficiency of the grating structure of the present disclosure under the condition of yet another period and yet another plating thickness.

Please refer to FIG. 12, the figure presents a diffraction efficiency curve under the condition where the period of the grating is 400 nm, the grating structure 31 is the high-thin type, and the thickness of the coated film on the top surface 3131 is 71% of the thickness of the coated film on the side surface 3133. It can be seen that the curve is relatively flat, and the average diffraction efficiency is more than 15%, which meets the design requirements.

Optionally, in an arranging direction of the plurality of the grating section 313, the grating section 313 have a height greater than a width of the grating section 313, the enhancement layer 315 coated on the top surface 3131 and the surface of the base 311 are of the same thickness, which is greater than a thickness of the enhancement layer 315 coated on the side surface 3133.

In the present embodiment, the grating structure 31 is of the short-fat type, that is, the height of the grating section 313 is smaller than the width of the grating section 313. The thickness of the enhancement layer 315 coated on the top surface 3131 and the coated thickness of the surface of the base 311 are the same, and both of them are greater than the coated thickness of the side surface 3133. In this way, it is possible to compensate for the height of the grating structure 31 so that each surface has the same probability of contact with the air medium, thereby ensuring uniformity and improving diffraction efficiency.

Figure 13:
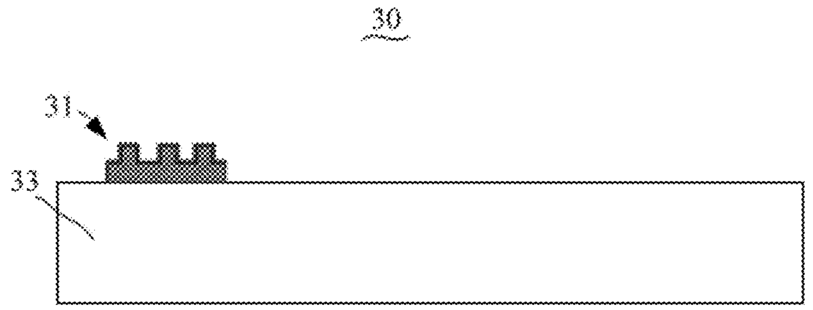
FIG. 13 is a cross-sectional view of a lens of one embodiment of the present disclosure.

Please refer to FIG. 13, to achieve the above objective, the present disclosure further proposes a lens 30 comprising a substrate 33 and the grating structure 31 as described in any one of the above, and a surface of the base 311 facing away from the grating section 313 is attached to the surface of the substrate 33. Since the grating structure 31 of the lens 30 of the present disclosure is based on the structure of the grating structure 31 according to any embodiment of the above. Therefore, the advantageous effects brought about by the above embodiments will not be repeated.

Herein, lens 30 may be an optical waveguide lens, or may be composed of multiple convex and concave lenses, which is not limited herein. The substrate 33 is made of a transparent material, such as glass, and may be a two-dimensional structure, that is, it is flat. In one embodiment, the substrate 33 comprises two opposing reflective surfaces that enable total internal reflection transmission of incident light through the setting of the incident light and the coupled-in grating. The grating structure 31 coated with a film may be a coupled-in grating, which is provided on a surface of the substrate 33 and capable of coupling the incident light into the substrate 33, thereby improving the light transmission efficiency. Of course, the lens 30 also comprises a coupled-out grating, which is provided on the surface of the substrate 33 facing away from the coupled-in grating. When the surface of the coupled-out grating is also coated with a film, it is possible to further enhance the diffraction efficiency of the light.

Figure 14:
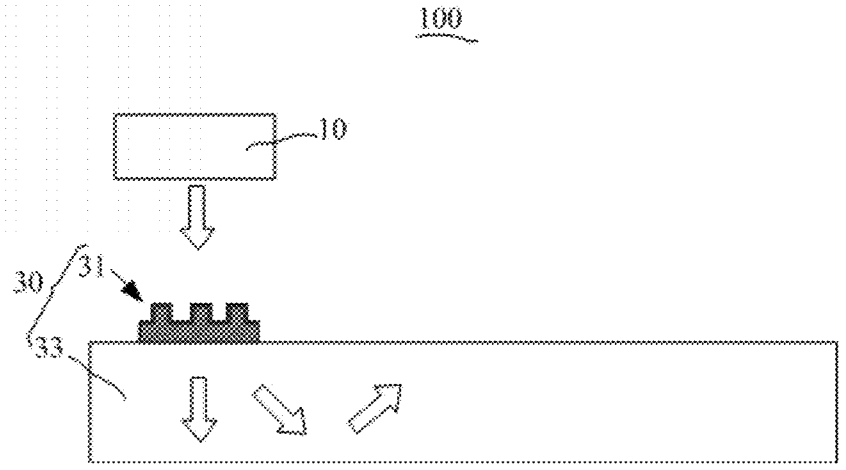
FIG. 14 is a schematic diagram of a head-mounted display of the present disclosure.

Please refer to FIG. 14, to achieve the above objective, the present disclosure further proposes a head-mounted display 100 comprising the image source 10 and the above lens 30, and the lens 30 is located on a light-emitting side of the image source 30. Since the lens 30 of the head-mounted display 100 of the present disclosure refers to the structure of the lens 30 in the above embodiment, the beneficial effects brought by the above embodiment will not be repeated herein.

In the present embodiment, the head-mounted display 100 may be an AR glasses or MR glasses, which includes the image source 10 configured for providing the incident light to the lens 30. When the incident light is incident from the air medium to the lens 30, it is first diffracted by the coupled-in grating, then enters into the substrate 33, is transmitted through a total internal reflection, exits from the coupled-out grating, and finally enters into the human eye.

In one embodiment, the grating structure 31, when being the coupled-in grating, is provided right facing the image source 10;

and/or, the image source 10 is a silicon-based liquid crystal module, a transmission liquid crystal module, a digital light processing module or a laser scanning module.

In the present embodiment, in order to receive the image source 10 as much as possible, when the grating structure 31 is set to be the coupled-in grating, the grating structure 31 is provided right facing the image source 10, that is, the projection of the image source 10 and the coupled-in grating on the substrate 33 coincide with each other, which ensures that the incident light is received by the coupled-in grating and enhances the light transmission efficiency.

The image source 10 comprises a display panel, which may be a Liquid Crystal on Silicon (LCOS), a transmissive Liquid Crystal Display (LCD), a Digital Light Processing (DLP), and a Laser Beam Scanning (LBS). Of course, the image source 10 also comprises a light source, which may optionally be an LED light source, provides a light source for the display panel, and forms the incident light after passing through the display panel for directing to the lens 30.

Optionally, the image source 10 has a field of view ranging from 40° to 60°;

and/or, the image source 10 has an emitting light wavelength ranging from 520 nm to 530 nm.

Wherein, the projector optical machine is used as an example of the image source 10, which converts the spatial position information of the image into the angular position information through the lens. Therefore, the size of the image is the field of view of the image, and the image source 10 of the present embodiment is suitable for the light wave with the field of view of the image being 40°~60° and the wavelength of 520 nm~530 nm, for example, a projection optical machine emitting green light (525 nm). By using the optimized coating design on the grating structure 31, it is possible to effectively improve the diffraction efficiency and transmission efficiency of the grating, and the film with high refractive index and good shape retention may improve the uniformity of wavelength and angle as well as the bandwidth, thereby improving the color and brightness uniformity of the head-mounted display 100 at different spatial positions or different angles.

The above are only preferred embodiments of the present disclosure, and are not intended to limit the patent scope of the present disclosure. All equivalent structural transformations made by utilizing the specification and the accompanying drawings under the inventive concept of the present disclosure, or directly/indirectly applying them in other related technical fields are included in the patent protection scope of the present disclosure.

The invention claimed is:

1. A grating structure, comprising a base and a plurality of grating sections provided on a surface of the base, the plurality of grating sections having a refractive index and being spaced apart in an extending direction of the base, wherein at least a portion of a surface of the plurality of grating sections is coated with an enhancement layer having a refractive index greater than the refractive index of the grating sections;

each of the grating sections comprises a top surface parallel to the surface of the base and a side surface connected to the top surface and the surface of the base, wherein each of the top surface, the side surface and the surface of the base provided with the grating sections are provided with an enhancement layer;

the enhancement layers coated on at least two of the top surface, the side surface and the surface of the base comprise different thicknesses;

the grating structure has a period set to A, and the thickness D of the enhancement layer ranges from 4% of A to 6% of A;

each grating section has a height H ranging from 40% of A to 60% of A; and/or in an arranging direction of the plurality of the grating sections, each grating section has a width ranging from 15% of A to 35% of A.

2. The grating structure according to claim 1, wherein the enhancement layer is made of one of titanium dioxide, alumina and magnesium oxide; and/or the refractive index of the enhancement layer is 1.25 times or more than the refractive index of the grating sections.

3. The grating structure according to claim 2, wherein the base is made of silicon dioxide or resin; and/or the grating sections are made of silicon dioxide or resin.

4. The grating structure according to claim 1, wherein in an arranging direction of the plurality of the grating sections, the grating sections have a height greater than a width of the grating sections; and/or the enhancement layers coated on the top surface and the surface of the base are of the same thickness, which is less than a thickness of the enhancement layer coated on the side surface.

5. The grating structure according to claim 4, wherein the thickness of the enhancement layer coated on the top surface is 70% to 80% of the thickness of the enhancement layer coated on the side surface.

6. The grating structure according to claim 1, wherein in an arranging direction of the plurality of the grating sections, the grating sections have a height greater than a width of the grating sections; and/or the enhancement layers coated on the top surface and the surface of the base are of the same thickness, which is greater than a thickness of the enhancement layer coated on the side surface.

7. The grating structure according to claim 1, wherein the enhancement layer is coated by means of atomic layer deposition, chemical vapor deposition, physical vapor deposition, or magnetron sputtering; and/or the grating structure is a coupled-in grating or coupled-out grating.

8. A lens, comprising a substrate and the grating structure according to claim 1, and wherein a surface of the base facing away from the grating section is attached to the surface of the substrate.

9. A head-mounted display, wherein the head-mounted display comprises an image source and the lens according to claim 8, and the lens is located on a light-emitting side of the image source.

10. The head-mounted display according to claim 9, wherein the grating structure, when being a coupled-in grating, is provided right facing the image source; and/or the image source is a silicon-based liquid crystal module, a transmission liquid crystal module, a digital light processing module or a laser scanning module.

11. The head-mounted display according to claim 9, wherein the image source has a field of view ranging from 40° to 60°; and/or the image source has an emitting light wavelength ranging from 520 nm to 530 nm.

* * * * *